No. 658,229. Patented Sept. 18, 1900.
J. D. BELL.
BREAD RAISING APPARATUS.
(Application filed Jan. 24, 1900.)
(No Model.) 2 Sheets—Sheet 1.
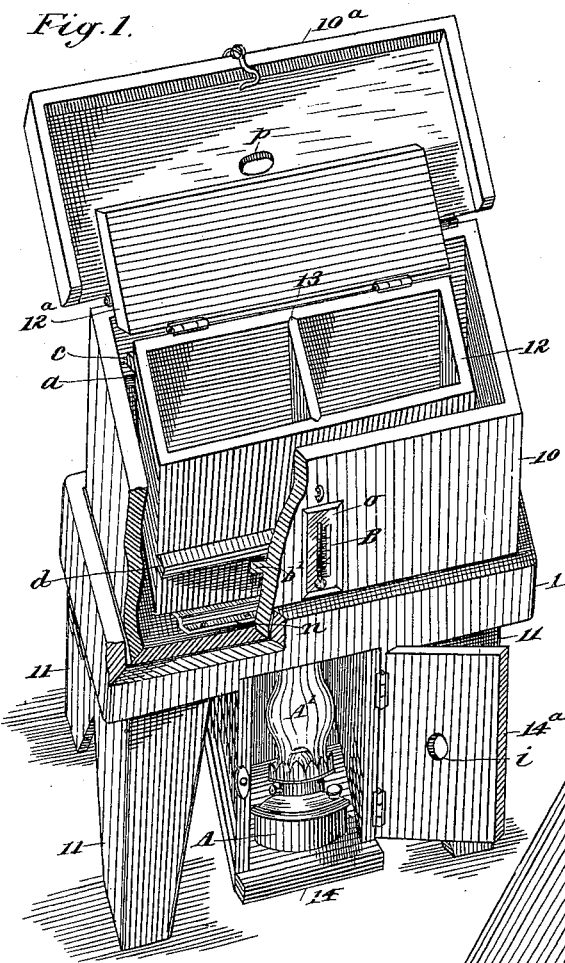
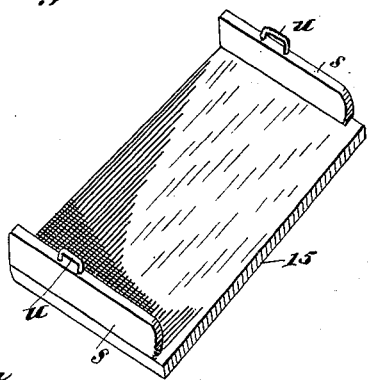
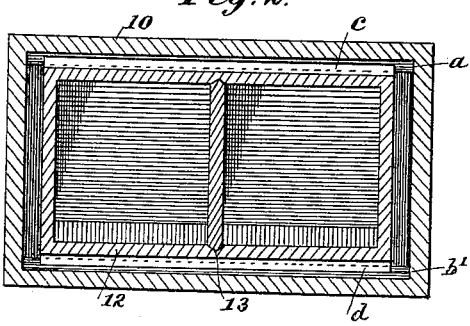
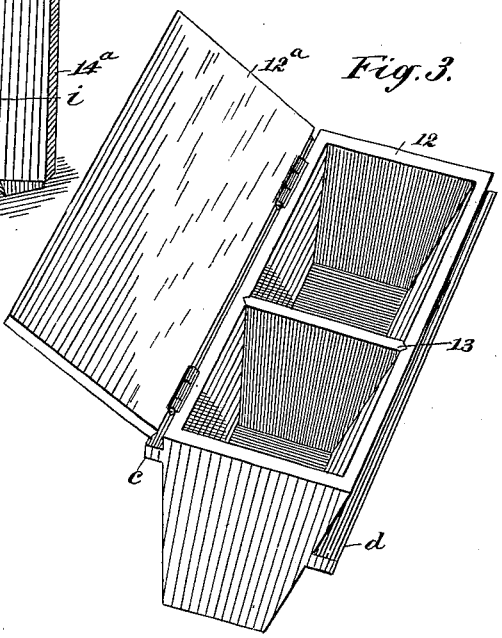
WITNESSES:
INVENTOR
John D. Bell
BY
ATTORNEYS No. 658,229. Patented Sept. 18, 1900.
J. D. BELL.
BREAD RAISING APPARATUS.
(Application filed Jan. 24, 1900.)
(No Model.) 2 Sheets—Sheet 2.
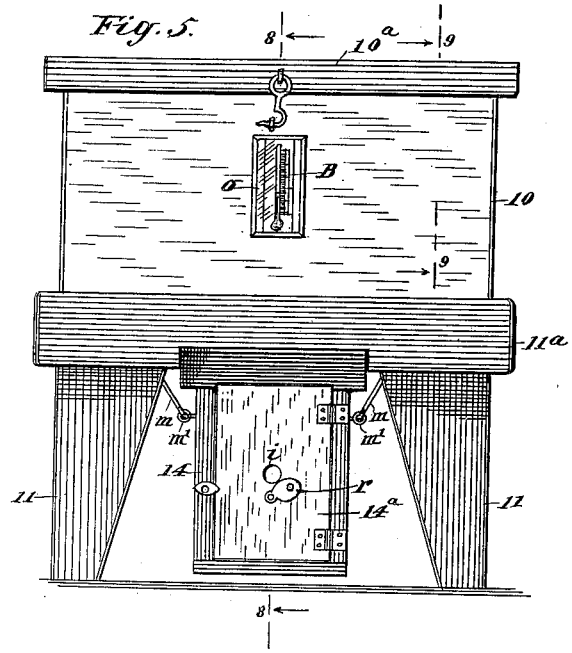
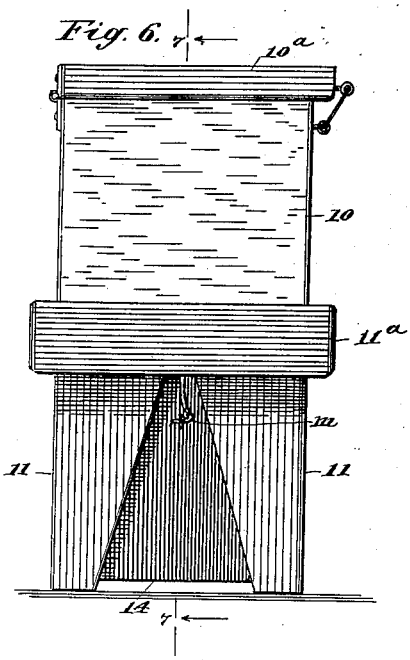
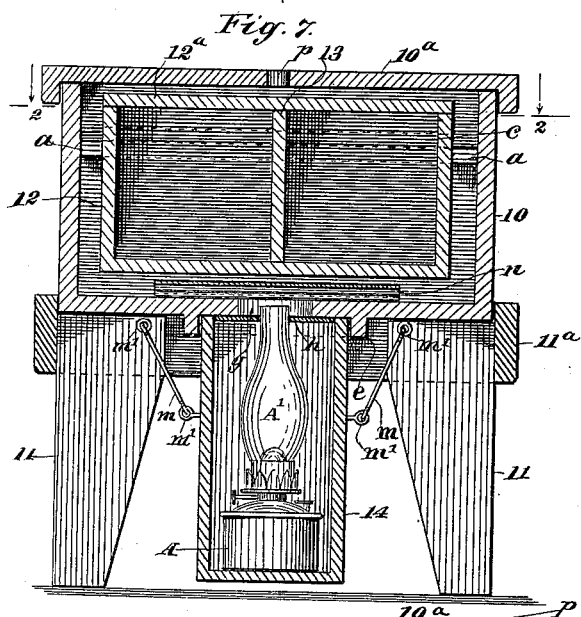
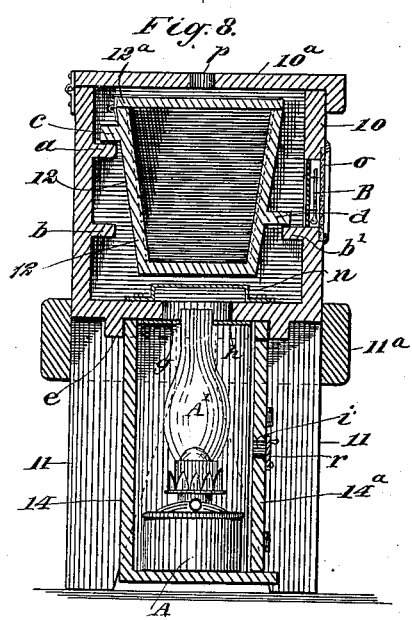
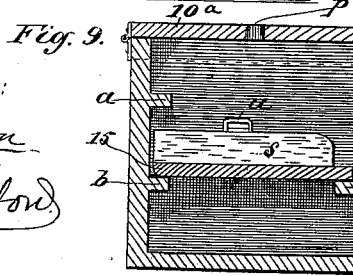
WITNESSES:
INVENTOR
John D. Bell
BY
ATTORNEYS

UNITED STATES PATENT OFFICE.

JOHN DAVID BELL, OF ARCADIA, KANSAS, ASSIGNOR OF ONE-THIRD TO CHARLES O. ANDERSON, OF SAME PLACE.

BREAD-RAISING APPARATUS.

SPECIFICATION forming part of Letters Patent No. 658,229, dated September 18, 1900.

Application filed January 24, 1900. Serial No. 2,602. (No model.)

*To all whom it may concern:*

Be it known that I, JOHN DAVID BELL, a citizen of the United States, and a resident of Arcadia, in the county of Crawford and State of Kansas, have invented a new and Improved Bread-Raising Apparatus, of which the following is a full, clear, and exact description.

This invention relates to the mixing and raising of bread or cake dough and to means for conveniently effecting the same, and has for its object to provide bread-raising apparatus of novel construction which enables the baker to at all times maintain the proper temperature of a batch of sponge or dough, and thus secure the uniform raising of the bread that is necessary for the best results in its manufacture.

The invention consists in the novel construction and combination of parts, as is hereinafter described, and defined in the appended claim.

Reference is to be had to the accompanying drawings, forming a part of this specification, in which similar characters of reference indicate corresponding parts in all the figures.

Figure 1 is a perspective view of the device, parts of which are broken away and others opened to show the interior construction. Fig. 2 is a sectional plan view substantially on the line 2 2 in Fig. 7. Fig. 3 is a perspective view of a combined mixing-box and flour-bin employed. Fig. 4 is a perspective view of a bread-supporting tray, which is a detail of the apparatus. Fig. 5 is a front view of the apparatus in operative condition. Fig. 6 is an end elevation of the same. Fig. 7 is a longitudinal vertical section substantially on the line 7 7 in Fig. 6. Fig. 8 is a transverse sectional view substantially on the line 8 8 in Fig. 5; and Fig. 9 is a transverse sectional view of the main box removed from its support, taken substantially on the line 9 9 in Fig. 5, showing the bread-tray in position therein, taking the place of the mixing-box.

In carrying into effect the features of the improvement, 10 represents the main box, which receives and supports other details and essentially comprises a rectangular receptacle of suitable size for effective service, having a preferably-hinged lid $10^a$. To elevate the main box 10 sufficiently for convenient service, it is seated removably upon the upper ends of the legs 11, which are located in and secured to the corners of the rectangular frame-piece $11^a$, the latter extending a short distance above the upper extremities of the legs, which adapts said frame-piece to serve as a guard for the retention of the box 10 in place on the legs 11.

A flange-like projection or ledge $a$ is formed or secured along the inner side of the rear wall of the main box 10 at a proper distance below the upper edge of the latter, said ledge being horizontally disposed and therefore parallel with the bottom wall of the box. At a suitable distance below the ledge $a$ two flanges $b\ b'$ are projected, respectively, from the rear and front walls of the main box 10, said flanges being opposite to each other and parallel with the ledge $a$.

The bread-raising box 12 is oblong and of somewhat less dimensions than the interior space within the main box 10 and has a cover $12^a$ hinged along one side edge of the box and cover. Preferably the body of the raising-box 12 is given less width in its lower portion by inclination of one or both sides thereof in an outward direction, and at a proper distance from the end walls of the box 12 a preferably removable partition 13 is located and held by any suitable means.

On the exterior of the rear wall of the box 12 a flange $c$ is projected outwardly and parallel with the top edge of the raising-box to which it is adjacent.

From the front wall of the raising-box 12 a flange $d$ projects, which is so located as to be adapted for seated engagement with the ledge or flange $b'$ of the main box 10 when the flange $c$ is seated upon the ledge $a$. The relative positions of the laterally-projecting flanges $a$ and $d$ with regard to the flanges $c$ and $b'$ should be such as will dispose the bottom wall of the raising-box 12 a proper distance above the bottom of the main box 10 and parallel therewith. For effective operation of the device it is essential that the mixing-box 12 be placed centrally within the main box 10 on the supporting-flanges $a$ and $b'$, so as to leave equal passages on all sides of the mixing-box.

A rectangular and preferably endless keeper-flange $e$ projects from the lower side of the bottom wall of the main box 10, surrounding the central aperture $g$ therein, and said keeper-flange is of such interior dimensions as enables it to retain in proper position the lamp-holder 14.

As shown, the holder 14 is in the form of an elongated rectangular casing, having its lower end closed by a level bottom wall and the top thereof covered by a metal diaphragm $h$, in which is a central orifice. The holder 14 is provided with a hinged door $14^a$, and in the holder a lamp A of any style may be placed and inclosed, the door $14^a$ having an orifice $i$ to admit air sufficient to aid combustion and mix with the products of combustion evolved by the lamp, said orifice being controlled by a pivoted gate $r$. The holder 14 and lamp A therein may be suspended from the bottom of the main box 10 by hooks $m$ and ring-eyes or staples $m'$, so that the casing will be held impinged at its upper edge against the bottom wall of the main box and be entered within the space inclosed by the rectangular keeper-flange $e$.

The chimney $A'$ of the lamp A is loosely fitted at its upper end within the orifice formed to receive it in the diaphragm-plate $h$.

Above the aperture $g$ in the bottom of the main box 10 a deflector $n$ is secured, this, as shown best in Figs. 7 and 8, being a plate of sheet metal bent to provide a central portion elevated a short distance above two side flanges that are flat and seat upon the inner surface of the main-box bottom wall over the aperture therein.

At the front of the main box 10 a thermometer B is located in an opening, so as to indicate the temperature within said box, the opening containing the thermometer having a pane $o$ of glass or other transparent material held over it exterior of the thermometer, so that the escape of heat is prevented and the free reading of degrees on the thermometer is facilitated.

I have specified a lamp as a preferred source of heat for raising the temperature of air that passes into and through the air-space surrounding the raising-box 12; but it is evident that a gas-jet or an electric heating medium may also be employed for the purpose.

The lamp A for convenience in illustration is somewhat exaggerated in size as compared with the dimensions of other parts of the device. In practice, however, it is essential that the heating medium may be of a capacity to insure the quick rise in temperature of air that is within the main box 10, and also air that is inducted by the upward draft which is afforded in the passages around all sides of the raising-box 12 and out of the hole $p$ that is formed in the lid $10^a$ of the main box 10.

The raising-box 12 may be employed entirely for mixing bread-sponge, and if this is desired the partition 13 can be readily removed by an upward movement of the same; but usually one compartment in said box is utilized for the holding of flour, so that it will be convenient to the mixing-compartment on the other side of the partition.

In operation after there has been a batch of bread-sponge mixed in one or both compartments of the mixing-box 12 and the box has been placed centrally in the main box 10 the lids of both boxes are closed and the lamp A is lighted in case the temperature is lower than that required for the proper raising of the sponge. The flame of the lamp A is graduated in height, so that a suitable temperature is attained within the main box 10, which will be communicated to the sponge through the walls of the mixing-box 12 and result in the speedy and perfect raising of the bread or cake sponge. It will be seen that the hot current of air passing upward around all sides of the mixing-box 12 can be exactly controlled by an adjustment of the gate $r$, so as to cover more or less of the air-inlet orifice $i$ in the door $14^a$. During the summer months, when the temperature of the interior of the main box 10 is higher than necessary for the effective raising of the bread-sponge without artificial heat, the lamp A and chimney $A'$ should be removed, and a cooling-current of air from any source may be introduced into the box 14, from which the air of reduced temperature will pass upwardly around the mixing-box 12 for the raising of bread-sponge therein. After the sponge has been properly raised the batch of bread material is worked out into loaves, as usual, and the tray 15 can be employed as a kneading-board, whereon the bread-loaves may be worked into proper consistency and form. The tray 15 is of a rectangular contour and preferably is furnished with end boards $s$, that project at a suitable height across each end of the tray and have handles $u$ thereon. The size of the tray 15 is such as will permit its easy introduction within the main box 10 and seated engagement with the opposite flanges $b\,b'$ therein, as clearly shown in Fig. 9, the raising-box 12 having been previously removed. After the loaves of bread have been formed they are then placed upon the tray 15 in the main box 10, and the latter is closed to attain the correct temperature within it for the second raising or "proving" of the bread before placing the loaves in the oven.

Having thus described my invention, I claim as new and desire to secure by Letters Patent—

A bread-raising apparatus, comprising a main box, a hinged lid on the main box having an aperture therein, a legged stand whereon the main box is removably seated, a smaller raising-box, a lid thereon, a removable partition in the raising-box, ledges on the main box and raising-box for the support of the latter centrally within the main box, a deflector-plate in the main box below the raising-box and over an aperture in the bottom of the main box, a casing hung from the bottom of the main box and inclosing the aperture therein, and a lamp in the casing adapted to transmit heat into the air-space between the main box and raising-box.

In testimony whereof I have signed my name to this specification in the presence of two subscribing witnesses.

JOHN DAVID BELL.

Witnesses:
  C. O. ANDERSON,
  ED. L. WIEST.